United States Patent
Sherman et al.

(10) Patent No.: US 10,858,579 B2
(45) Date of Patent: Dec. 8, 2020

(54) STRUCTURAL EXPANDABLE MATERIALS (71) Applicant: Powdermet, Inc., Euclid, OH (US)

(72) Inventors: Andrew Sherman, Mentor, OH (US); Brian Doud, Cleveland Heights, OH (US)

(73) Assignee: Powdermet, Inc., Euclid, OH (US)

( * ) Notice: Subject to any disclaimer, the term of this patent is extended or adjusted under 35 U.S.C. 154(b) by 103 days.

(21) Appl. No.: 16/131,454

(22) Filed: Sep. 14, 2018

(65) Prior Publication Data
US 2019/0016951 A1    Jan. 17, 2019

Related U.S. Application Data (62) Division of application No. 14/940,209, filed on Nov. 13, 2015, now Pat. No. 10,106,730.

(60) Provisional application No. 62/080,448, filed on Nov. 17, 2014.

(51) Int. Cl.
  *C09K 8/80* (2006.01)
  *C09K 8/70* (2006.01)
  *E21B 43/267* (2006.01)

(52) U.S. Cl.
  CPC .............. *C09K 8/805* (2013.01); *C09K 8/706* (2013.01); *C09K 8/80* (2013.01); *E21B 43/267* (2013.01); *C09K 2208/08* (2013.01); *C09K 2208/10* (2013.01)

(58) Field of Classification Search
  None
  See application file for complete search history.

(56) References Cited

U.S. PATENT DOCUMENTS

| | | | |
|---|---|---|---|
| 3,220,479 A | 11/1965 | Ortloff et al. | |
| 2002/0092654 A1 | 7/2002 | Coronado et al. | |
| 2003/0220039 A1 | 11/2003 | Chen et al. | |
| 2006/0078682 A1 | 4/2006 | McDaniel et al. | |
| 2006/0192039 A1 | 8/2006 | Smith | |
| 2010/0059228 A1 | 3/2010 | Jones et al. | |
| 2012/0175134 A1* | 7/2012 | Robisson | E21B 33/1208 166/387 |

FOREIGN PATENT DOCUMENTS

CN    101432132    5/2009

* cited by examiner

*Primary Examiner* — Jeffrey D Washville
(74) *Attorney, Agent, or Firm* — Ulmer & Berne LLP (57) ABSTRACT

A composite particle that incorporates a material and is designed to undergo a reaction and/or mechanical or chemical change with the environment to increase in volume. The composite particle can be combined with a constraining matrix to create an expandable particle upon reaction. These particles can be used in stimulating wells, including oil and gas reservoirs.

19 Claims, 3 Drawing Sheets

STRUCTURAL EXPANDABLE MATERIALS

The invention is a divisional application of U.S. patent application Ser. No. 14/940,209 filed Nov. 13, 2015, which in turn claims priority on U.S. Provisional Patent Application Ser. No. 62/080,448 filed Nov. 17, 2014, which is incorporated herein by reference.

The invention relates to the compositions, the structure, and the use of expandable composite materials utilizing dispersed reactive mechanical or chemical change materials that undergo volumetric expansion, and to methods of converting these reactions into a controlled force for use in well completion and stimulation processes.

BACKGROUND OF THE INVENTION

The most widely used well completion technique for extracting resources from unconventional, tight oil and gas formations, and geothermal energy extraction employs hydraulic fracturing. Hydraulic fracturing utilizes a solution of water, additives, and proppants (sand or man-made ceramic media) that create a long fracture in the shale or rock to enhance and extend natural fractures and thereby increase well productivity. Ideally, the fracture network is as interlinked as possible to natural fractures and is held open against closure forces by proppants. Proppants normally consist of silica-based sands or bauxite (aluminosilicate) materials that are pumped in with the working fluid that serves to hold the fracture surfaces open so that oil or natural gas can flow back into the well for removal. Larger proppant particles are used to increase permeability, while higher strength materials enable the proppants to withstand higher closure stresses. Because the proppants are fairly dense (2.8-3.6 g/cc), the proppants tend to settle out (particularly larger proppants) in the well. Chemical additives are typically added to alter the viscosity of the working fluid to better distribute the proppants, thus greatly increasing friction and pumping costs. Smaller and lighter proppants, combined with improved control over the development of fracture networks, are needed to improve the economics of water, and chemical use in extracting geothermal energy, oil and gas resources from the earth's lithosphere.

Hydraulic fracturing has revolutionized energy production from domestic resources, including tight oil and gas formations, and for unlocking geothermal energy. Hydraulic fracturing was first used in the 1940s, but has since evolved and now is an important technique in the development of oil and gas reserves. Combined with directional drilling, hydraulic fracturing has also demonstrated applications in enhanced geothermal energy (EGS). According to Tester, et al., EGS is estimated to be over 13 million exojoules (EJ), which, with technology improvements, could lead to an extractable recovery of 200,000 EJ's, or roughly 2000 times the annual energy needs of the United States. Continued development of methods to control the development and permeability of fracture networks in tight and hard rock is essential to the continued development of enhanced geothermal energy, as well as oil and gas reserves.

The development of unconventional oil and gas (particularly gas) resources, as well as geothermal energy remains very expensive, and requires the use of large volumes of water. Reducing the cost and water usage for completion operations in hydraulic fracturing is important for continued development of unconventional energy resources.

SUMMARY OF THE INVENTION

The invention relates to the compositions, the structure, and the use of expandable composite materials utilizing dispersed reactive mechanical or chemical change materials that undergo volumetric expansion and to methods of converting these reactions into a controlled force for use in well completion and stimulation processes. One non-limiting application of the present invention specifically relates to a method of providing crack widening and flow enhancement in wells using lower water usage through the development of expandable, pumpable structural materials. These expandable structural materials, when used as proppants, can allow fracture network extension and flow enhancement with lower water volumes and smaller proppant sizes, and/or can be used to overcome and/or offset high closure forces to allow for lower cost, lower density proppants to be used. Reduction in proppant size and density allows for the reduction in water usage and chemicals to transport the proppants. The expandable proppants can reduce water use through crack extension and crack opening after pumping, thus further enabling reduction of water usage and/or increasing recovery for a given treatment.

In one non-limiting aspect of the present invention, in order to reduce water use and/or improve fracture conductivity, as well as other applications (such as higher force packers), expandable particles have been developed in accordance with the present invention that can be easily delivered into fractures to enable the delivery of energy and force locally. This energy is delivered in the form of a mechanical or chemical change to further extend the fractures and counter closure forces exerted by the rock. Two basic methods have been identified to deliver force: 1) in situ-thermally activated shape change materials, and 2) oxidative reaction of metals with subsequent volumetric expansion. The first technique involves a reversible martensitic reaction. The second technique involves reaction with water and/or carbon dioxide to turn metals into oxides, hydroxides, or carbonates (e.g., iron to rust, etc.), with a corresponding expansion of the material. The percent volume expansion is generally at least about 2%, and typically at least about 20%. Generally, the volume expansion is up to about 200% (e.g., 2-200%, 20-200%, 42-141%, etc. and all values and ranges therebetween).

In another non-limiting aspect of the present invention, the invention relates to the design and control of the material microstructure and composition to deliver this force in a controlled manner (e.g., to apply force to the rock-face rather than just fill and plug the crack). The invention is able to address the economic challenge of developing use protocols to utilize this ability to apply a pumpable, targeted delivery of force to reduce costs and/or to increase recovery through the development of improved fracture networks and fracture permeability in a well.

In another non-limiting aspect of the present invention, technology relating to a) nanoparticle processing techniques for metals and non-oxides, and/or b) encapsulation technology of metals, metal-oxides, ceramics and polymer systems can be used to facilitate in the development of the expandable composite materials of the present invention. The expandable composite materials can be used as a proppant that can be delivered into completions systems before expanding, and then react to force the fractures to grow without the use of additional volumes of water and chemicals. A non-limiting feature of the present invention is to develop engineered, permeable particles that can produce significant forces (while remaining permeable to flow) against a constraining rock layer. This non-limiting feature can be accomplished by at least three novel aspects of the present invention, namely 1) the use of microscale engineered composite expandables in a binder, 2) the use of thermally activated shape change "precollapsed" balloons, and/or 3) the use of constrained expandables contained in a restraining capsule or tube to control force delivery.

In another non-limiting aspect of the present invention, there is provided an expandable composite material that is configured and formulated to expand in a controlled or predefined environment. The expandable composite material has a compressive strength after expansion of at least 2,000 psig. The expandable composite material has a compressive strength after expansion of up to about 1,000,000 psig or more (e.g., 2,000 psig to 1,000,000 psig and all values and ranges therebetween). The expandable composite material typically has a compressive strength after expansion of at least 10,000 psig, and typically at least 30,000 psig. The compressive strength of the expandable composite material is the capacity of the expandable composite material to withstand loads to the point that the size or volume of the expandable composite material reduces by less than 2%.

The expandable composite material can be configured and formulated to be unreactive in ambient conditions; however, this is not required. As defined herein, ambient conditions is a temperature of about 67-80° F., atmospheric pressure of about 1 atmosphere, and a gas environment at sea level on Earth (e.g., 78.09 vol. % nitrogen, 20.95 vol. % oxygen 0.93% argon, 0.039 vol. % carbon dioxide, and small amounts of other gases). At least a portion of the expandable composite material, when exposed to activating conditions, can be configured and formulated to undergo a volumetric expansion of at least 5%, and typically at least 50% (e.g. 5% to 5000% and all values and ranges therebetween). The expandable composite material can be configured and formulated to release no more than about 10% fines (e.g., 0.01% to 10% and all values and ranges therebetween) after exposure to crushing strengths of 2-7,000 psig (and all values and ranges therebetween); however, this is not required.

In another non-limiting aspect of the present invention, the expandable composite material retains a permeability at least 300 millidarcy, and typically at least 500 millidarcys (e.g., 300 md to 10,000 md and all values and ranges therebetween) after expanding with clamping forces of 1000-10,000 psig (and all values and ranges therebetween) under API-RP61 conductivity testing. In one non-limiting embodiment, the expandable composite material retains a permeability at least 1500 millidarcys after expanding with clamping forces of 1000-7,000 psig under API-RP61 conductivity testing.

In another non-limiting aspect of the present invention, the expandable composite material includes 10-80% by volume of an expandable material. The expandable material can be formulated to undergo a mechanical and/or chemical change resulting in a volumetric expansion of at least 2% and typically at least 50% (e.g., 2-5000% and all values and ranges therebetween) by reaction and/or exposure to a fluid environment. In one non-limiting arrangement, the expandable material is formulated to undergo a mechanical and/or chemical change resulting in a volumetric expansion of at least 20% by reaction and/or exposure to a fluid environment. In another non-limiting arrangement, the expandable composition material can include a matrix and/or binder material that is used to bind together particles of the expandable material. The matrix and/or binder material is generally permeable or semi-permeable to water. In one non-limiting arrangement, the matrix and/or binder material is semi-permeable to high temperature (e.g., at least 100° F., typically 100-210° F. and all values and ranges therebetween) and high pressure water (e.g., at least 10 psig, typically 10-10,000 psig and all values and ranges therebetween). The expandable material or the expandable material in combination with the matrix and/or binder material can have a compressive strength before and/or after expansion of at least 2,000 psig, and typically at least 10,000 psig (e.g., 2,000 psig to 1,000,000 psig and all values and ranges therebetween); however this is not required.

In another non-limiting aspect of the present invention, the reaction of the expandable material is selected from the group consisting of a hydrolization reaction, a carbonation reaction, and an oxidation reaction, or combination thereof.

In another non-limiting aspect of the present invention, the expandable material can include one or more materials selected from the group consisting of flakes, fibers, powders and nanopowders; however, this is not required. When the expandable material is combined with a matrix and/or binder material, the expandable material can form a continuous or discontinuous system. When the expandable material is combined with a matrix and/or binder material, the expandable material can be uniformly or non-uniformly dispersed in the matrix and/or binder material.

In another non-limiting aspect of the present invention, the expandable material can include one or more materials selected from the group consisting of Ca, Li, CaO, $Li_2O$, $Na_2O$, Fe, Al, Si, Mg, $K_2O$ and Zn. The expandable material generally ranges in size from about 106 μm to 10 mm.

In another non-limiting aspect of the present invention, the expandable composite material can include one or more polymer materials; however, this is not required. When the expandable composite material includes a matrix or binder material, such matrix or binder material can include or be formed of a polymer material. The polymer material can include one or more materials selected from the group consisting of polyacetals, polysulfones, polyurea, epoxys, silanes, carbosilanes, silicone, polyarylate, and polyimide.

In another non-limiting aspect of the present invention, the expandable composite material can include one or more catalysts for accelerating the reaction of the expandable material; however, this is not required. The catalyst can include one or more materials selected from the group consisting of $AlCl_3$ and a galvanically active material.

In another non-limiting aspect of the present invention, the expandable material can include strengthening and/or diluting fillers; however, this is not required. The strengthening and/or diluting fillers can include one or more materials selected from the group consisting of fumed silica, silica, glass fibers, carbon fibers, carbon nanotubes and other finely divided inorganic material.

In another non-limiting aspect of the present invention, the expandable material can be an agglomerated or composite expandable material which undergoes a mechanical or chemical change upon reaction of a volumetric expansion of at least 2%, typically at least 20%, and more typically at least 50%, and which is constrained through a permeable or semi-permeable membrane or by encapsulation.

In another non-limiting aspect of the present invention, the expandable material can include a surface coating or protective layer that is formulated to control the timing and/or conditions under which the reaction or expanding occurs; however, this is not required. The surface coating can be formulated to dissolve when exposed to a controlled external stimulus (e.g., temperature and/or pH, chemicals, etc.). The surface coating can be used to control activation of the expanding of the core or core composite. The surface coating can include one or more materials such as, but not limited to, polyester, polyether, polyamine, polyimide, polyacetal, polyvinyl, polyureathane, epoxy, polysiloxane, polycarbosilane, polysilane, and polysulfone. The surface coating generally has a thickness of about 0.1 µm to 1 mm and any value or range therebetween.

In another non-limiting aspect of the present invention, the expandable material can optionally include a shape memory alloy coated microballoon, a microlattice, reticulated foam, or syntactic shape memory alloy which is stabilized in an expanded state, pre-compressed, and then expanded to provide an actuating force under conditions suitable for wellness or health completion and/or development; however, this is not required. In one non-limiting embodiment, there is provided an expandable material which comprises a shape memory alloy coated microballoon, a microlattice, reticulated foam, or syntactic shape memory alloy which is stabilized in an expanded state, pre-compressed, and then expanded to provide an actuating force under conditions suitable for well completion and development.

In another non-limiting aspect of the present invention, the expandable material can be in the form of a proppant used to open cracks and control permeability in underground formations; however, this is not required.

In another non-limiting aspect of the present invention, the expandable material can be used to provide sealing against high differential pressures by applying sealing forces of at least 2000 psig, and typically at least 5,000 psig clamping/sealing force.

In another non-limiting aspect of the present invention, there can be provided a fluid actuated telescoping or expandable device which contains the expandable material of the present invention, and wherein the expandable material is located in a structural chamber in the fluid actuated telescoping or expandable device. The structural chamber can have at least one opening which may include a dissolvable plug to control fluid flow into the structural chamber. The structural chamber can be designed to provide at about 2,000-60,000 psig force. The fluid actuated telescoping or expandable device can be designed to perforate and/or enhance wellbore communication with a formation; however, this is not required. The fluid actuated telescoping or expandable device can be used to actuate a downhole device without direct surface intervention; however, this is not required.

In another non-limiting aspect of the present invention, the expandable material can be used as a surface coating to a structural underlayment, wherein such underlayment can be a sand particle and/or a ceramic particle; however, this is not required.

One non-limiting object of the present invention is the provision of expandable composite materials utilizing dispersed reactive mechanical or chemical change materials that undergo volumetric expansion, and to methods of converting these reactions into a controlled force for use in well completion and stimulation processes.

Another non-limiting object of the present invention is the provision of a method of providing crack widening and flow enhancement in wells using lower water usage through the development of expandable, pumpable structural materials.

Another non-limiting object of the present invention is the provision of an expandable structural materials that can enable fracture network extension and/or flow enhancement with lower water volumes and/or smaller proppant sizes, and/or can be used to overcome and/or offset high closure forces to allow for lower cost, lower density proppants to be used.

Another non-limiting object of the present invention is the provision of expandable particles that can be easily delivered into fractures to enable the delivery of energy and/or force locally.

Another non-limiting object of the present invention is the provision of a method for controlling the material microstructure and/or composition expandable particles to deliver force in a controlled manner.

Another non-limiting object of the present invention is the provision of expandable composite materials used as a proppant that can be delivered into completions systems before expanding, and then react to force the fractures to grow without the use of additional volumes of water and chemicals.

Another non-limiting object of the present invention is the provision of engineered, permeable particles that can produce significant forces, while optionally remaining permeable to flow, against a constraining rock layer.

Another non-limiting object of the present invention is the provision of 1) using composite expandables in a binder, 2) using thermally activated shape change "precollapsed" balloons, and/or 3) using constrained expandables contained in a restraining capsule or tube to control force delivery.

Another non-limiting object of the present invention is the provision of engineered, pumpable particles that can be used 1) to deliver mechanical forces in a controlled and engineered manner inside of a fracture network, 2) to expand and widen the fracture network over time, and/or 3) as high force reactive expandables for a variety of applications.

Another non-limiting object of the present invention is the provision of high force reactive expandables to utilize and/or combine a plurality of high surface area core particles embedded into a high strength water-permeable matrix that will expand, or expand, in contact with formation water under formation temperatures.

Another non-limiting object of the present invention is the provision of high force reactive expandables that expand or expand via oxidation/hydration/carbonation to an incompressible solid with a higher volume as compared to the starting material.

Another non-limiting object of the present invention is the provision of high force reactive expandables that are engineered to act as a force delivery system that applies and directs this force to widen cracks and/or counter the natural rock clamping forces, and/or to form a durable seal or actuation suitable for use at high pressures.

Another non-limiting object of the present invention is the provision of high force reactive expandables that remain permeable and will deliver massive force to counteract the rock clamping force and will widen and/or will extend fracture networks occurring in the rock.

Another non-limiting object of the present invention is the provision of high force reactive expandables that do not remain permeable or remain porous but have lower permeability than the initial starting permeability.

Another non-limiting object of the present invention is the provision of providing controllable high force reactive expandables that coat, encapsulate or otherwise shield the expandable core particle with a dissolving/triggerable surface coating that will only dissolve under specific formation conditions.

Another non-limiting object of the present invention is the provision of high force reactive expandables that can be designed to constrain the volume expansion of the high force reactive expandables to translate into forces applied to fracture opening, as opposed to simple filling of the facture void.

Another non-limiting object of the present invention is the provision of high force reactive expandables derived from metal-coated spheres.

Another non-limiting object of the present invention is the provision of high force reactive expandables that can be designed as a function of the clamping force and the nature of the rock formation, in addition to the crack size.

Another non-limiting object of the present invention is the provision of a method to control the rate and/or completion of the oxidation reaction through 1) control over active particle surface area, 2) microstructure composition by particle placement and alignment, 3) binder/polymer permeability control, 4) the addition of catalysis (e.g., $AlCl_3$-used to activate iron surfaces), and/or 5) control over water permeability/transport to the metal surface.

Another non-limiting object of the present invention is the provision of high force reactive expandables that include ultrafine and near nanomaterials, as well as metallic flakes to be used to tailor the performance and response of the expandable materials.

Another non-limiting object of the present invention is the provision of high force reactive expandables that have mechanical properties such as modulus, creep strength, and/or fracture strength controlled through the addition of fillers and diluents and/or semi-permeable engineering polymers.

Another non-limiting object of the present invention is the provision of high force reactive expandables that can be triggered or reacted to provide the controlled application of high forces while remaining highly permeable.

Another non-limiting object of the present invention is the provision of high force reactive expandables that have coated fillers with the expandable material for controlled directional expansion.

Another non-limiting object of the present invention is the provision of high force reactive expandables to expand existing crack networks without the use of large volumes of water or fluids.

Another non-limiting object of the present invention is the provision of high force reactive expandables that have alignment of fibers and coated fibers with the expandable material for controlled directional expansion.

Other objects, advantages, and novel features of the present invention will become apparent from the following detailed description of the invention when considered in conjunction with the accompanying drawings.

BRIEF DESCRIPTION OF THE DRAWINGS

Referring particularly to the drawings for the purposes of illustration only and not limitation.

DETAILED DESCRIPTION OF NON-LIMITING EMBODIMENTS

Referring now to the following description and drawings, the invention relates to engineered, pumpable particles that can be used 1) to deliver mechanical forces in a controlled and engineered manner inside of a fracture network, 2) to expand and widen the fracture network over time, and/or 3) as high force reactive expandables for a variety of applications. In one non-limiting aspect of the invention, the high force reactive expandables utilize and combine a plurality of high surface area core particles embedded in a high strength water-permeable matrix that will expand, or expand, in contact with formation water under formation temperatures. In another and/or alternative non-limiting aspect of the invention, the base expansion reaction of the high force reactive expandables is an oxidation/hydration/carbonation to an incompressible solid with a higher volume as compared to the starting material. One non-limiting example is the reaction of slaked lime, such as where CaO forms calcium hydroxide before converting to calcium carbonate (in carbonated water), which produces a change in volume (e.g., cumulative volume change of 100-220%), and even a greater volume change when starting with calcium metal.

The high force reactive expandables are engineered to act as a force delivery system (proppant or sealing device) that applies and directs this force to widen cracks and/or to counter the natural rock clamping forces, and/or to form a durable seal or actuation suitable for use at high pressures. This feature of the high force reactive expandables is similar to the action of water freezing and resulting in the cracking of rock, but with about 3-100× the force/magnitude of the ice expansion reaction. In discreet particles (proppants), the high force reactive expandables can be designed to remain permeable (e.g., not expand shut), to deliver massive force to counteract the rock clamping force, and/or to widen and/or extend fracture networks occurring in the rock. In sealing applications, the microstructure and matrix properties of the high force reactive expandables can be designed to be impermeable, or can remain porous but have lower permeability than the initial starting permeability.

In another non-limiting aspect of the invention, the deployment of the high force reactive expandables can be at least partially controlled. Such control can be accomplished by coating, encapsulating, microstructure placement and alignment and/or otherwise shielding the expandable core particle with a dissolving/triggerable surface coating that will dissolve under specific formation conditions. The volumetric expansion of the expandable core particle in such an aspect of the invention can then be constrained to deliver force in the desired directions rather than just filling and/or sealing the crack (e.g., can be engineered to close off a crack when it encounters water if placed with a hydrocarbon fluid, etc.).

Figure 1:
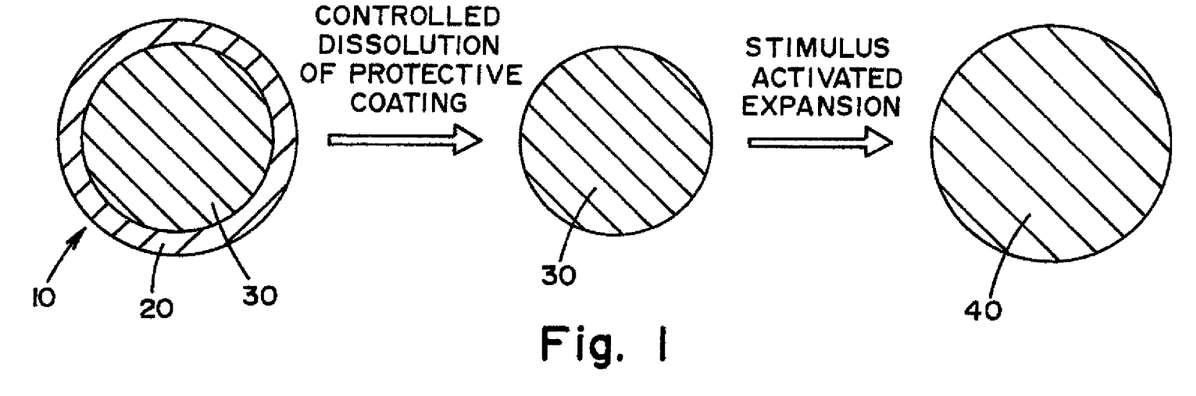
FIG. 1 is an illustration of core particles reacting under controlled stimulus, at which point the core particle will expand, expanding the fracture to enhance oil and gas recovery.
Figure 2A:
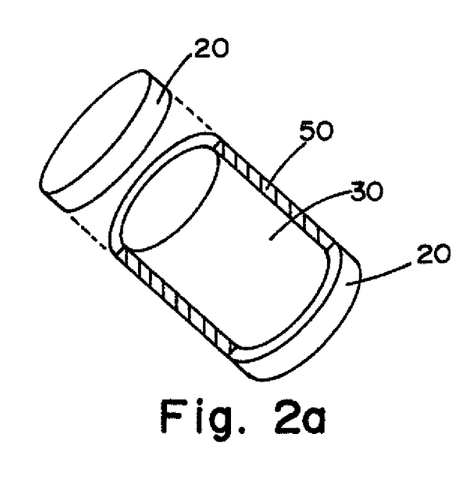
FIGS. 2a and 2b illustrate a non-limiting method of engineering a force delivery system for translating expanding into fracture opening, namely constraint by a semi-permeable or impermeable matrix; and, FIGS. 3a and 3b are schematics of shape memory alloy syntactic, as well as actual syntactic metal.
Figure 2B:
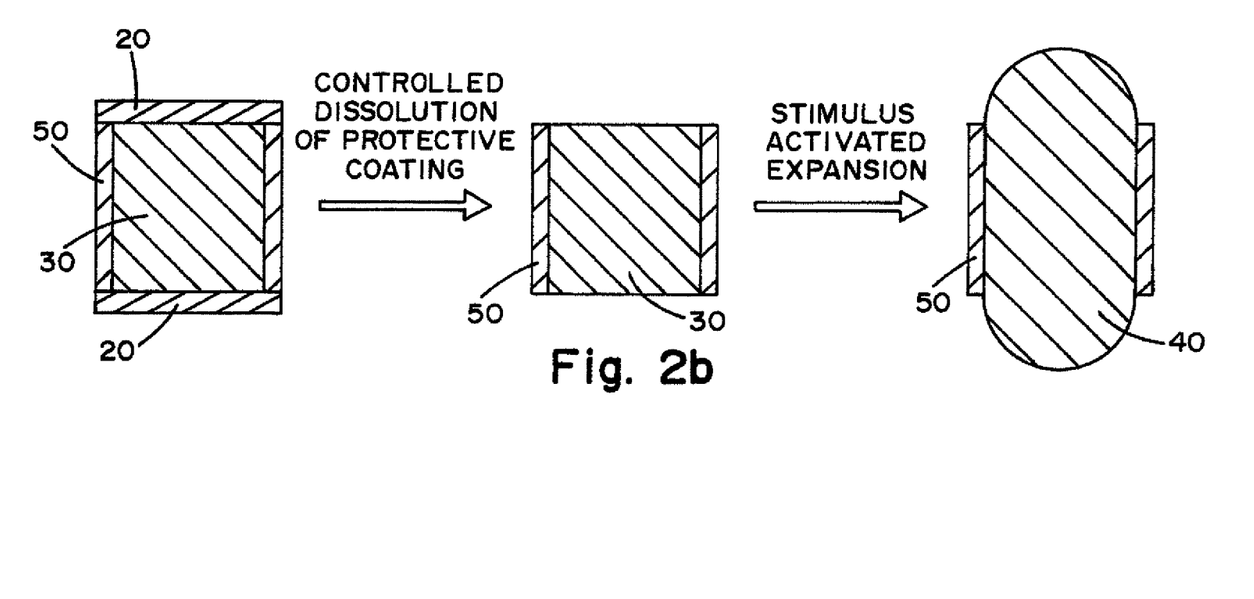

FIGS. 1 and 2 illustrate non-limiting methods for controlling the volumetric expansion of the expandable core particle. The core particles can be designed to react under controlled stimulus, at which point the core will expand, thereby expanding the fracture in a subterranean formation to enhance oil and gas recovery. One non-limiting feature of the invention is the controlling of the timing/trigger, and/or amount and/or speed of the expanding reaction. Control/trigger coatings can also be used (e.g., temperature activated coatings, chemically activated engineered response coatings, etc.). Control of the protective layer thickness and/or composition can be used to dictate where and under what conditions the reactive composite core particle will be exposed to formation fluids. Once exposed, the expandable materials will expand volumetrically and, with properly engineered constraint, direct the volumetric expansion as a normal force to open and/or extend fractures. In discrete form, the high force reactive expandables can be pumpable, such that they can be positioned into the fracture network during well completion, and then subsequently reacted to expand the fracture without further use of high pressure hydraulic pumping (e.g., such as after screenout, or in secondary fractures that may not receive the majority of the hydraulic flow/pressure).

Referring to FIG. 1, there is illustrated an expandable composite material 10 that includes a protective layer or surface coating 20, an expandable core 30 which can include, but is not limited to, an expanding metal, structural filler, and activator in a diluent/binder to control mechanical properties. The protective layer is generally formulated to dissolve when exposed to a controlled external stimulus (e.g., temperature and/or pH, chemicals, etc.). The protective layer is used to control activation of the expanding of the expandable core 30, which upon expansion becomes expanded core 40. Expandable composite material 10 can range in size from, but is not limited to, any size from 106 µm to 10 mm and any value or range therebetween, and generally ranges from 420 µm to 2.36 mm or any value or range therebetween. Protective layer 20 can be comprised of one or more of, but not limited to, polyester, polyether, polyamine, polyamide, polyacetal, polyvinyl, polyureathane, epoxy, polysiloxane, polycarbosilane, polysilane, and polysulfone. Protective layer 20 can range in thickness from, but not limited to, 0.1 to 1 mm and any value or range therebetween, and generally range from 10 µm to 100 µm and any value or range therebetween. Composition of the expandable core 30 can include an expanding material that can be, but is not limited to, Ca, Li, CaO, $Li_2O$, $Na_2O$, Fe, Al, Si, Mg, $K_2O$ and Zn. The expandable material can range in volumetric percentage of expandable core 30 of, but not limited to, 5% to 60% and any value or range therebetween, and generally range from 20% to 40% and any value or range therebetween. Composition of the expandable core 30 may or may not include a structural filler that can be, but is not limited to, fumed silica, silica, glass fibers, carbon fibers, carbon nanotubes and other finely divided inorganic material. Structural filler can range in volumetric percentage of expandable core 30 of, but not limited to, 1% to 30% and any value or range therebetween, and generally range from 5% to 20% and any value or range therebetween. Composition of expandable core 30 may or may not include an activator that can be, but is not limited to, peroxide, metal chloride, or galvanically active material. Composition of expandable core 30 can include a diluent/binder that can be, but is not limited to polyacetals, polysulfones, polyurea, epoxys, silanes, carbosilanes, silicone, polyarylate, and polyimide. Binder can range in volumetric percentage of expandable core 30 of, but not limited to, 50% to 90% and any value or range therebetween, and generally range from 50% to 70% and any value or range therebetween. Expandable core 30 expands into expanded core 40 in the range of 5% to 50% volumetric expansion and any value or range therebetween, and generally in the range of 5% to 20% and any value or range therebetween.

Referring now to FIGS. 2a and 2b, a non-limiting method of engineering force delivery system for translating expanding into a fracture opening is illustrated, namely constraint by a semi-permeable or impermeable sleeve (FIG. 2a). Constraining sleeve translates triggered expansion into a uniaxial force (FIG. 2b). The protective layer 20 (in the form of a plug) is formulated to dissolve or become permeable when exposed to controlled external stimulus (temperature, pH, certain chemicals, etc.) to cause the protective layer to dissolve or otherwise breakdown, thereby controlling activation of expanding of the expandable core 30. Upon expansion to expanded core 40 constraining sleeve 50 directs expansion forces parallel to constraining sleeve.

The expandable material can range in size from, but is not limited to, any size from 106 µm to 10 mm or therebetween, and generally range from 420 µm to 2.36 mm or any size therebetween. The protective layer 20 can be comprised of one or more of, but not limited to, polyester, polyether, polyamine, polyamide, polyacetal, polyvinyl, polyureathane, epoxy, polysiloxane, polycarbosilane, polysilane, and polysulfone. Protective layer 20 can range in thickness from, but is not limited to, 0.1 µm to 1 mm, and generally range from 10 µm to 100 µm. Composition of expandable core 30 can include an expanding material that can be, but is not limited to, Ca, Li, CaO, $Li_2O$, $Na_2O$, Fe, Al, Si, Mg, $K_2O$ and Zn. The expandable material can range in volumetric percentage of expandable core 30 of, but is not limited to, 5% to 60%, and generally range from 20% to 40%. The composition of expandable core 30 may or may not include a structural filler that can be, but is not limited to, fumed silica, silica, glass fibers, carbon fibers, carbon nanotubes and other finely divided inorganic material. The structural filler can range in volumetric percentage of expandable core 30 of, but is not limited to, 1% to 30%, and generally range from 5% to 20%. The composition of expandable core 30 may or may not include an activator that can be, but is not limited to, peroxide, metal chloride, or galvanically active material. The composition of expandable core 30 can include a diluent/binder that can be, but is not limited to, polyacetals, polysulfones, polyurea, epoxies, silanes, carbosilanes, silicone, polyarylate, and polyimide. The binder can range in volumetric percentage of expandable core 30 of, but is not limited to, 50% to 90%, and generally range from 50% to 70%. Expandable core 30 is configured to expand into expanded core 40 in the range of 5% to 50% volumetric expansion, and generally in the range of 5% to 20%. The constraining sleeve 50 can include, but is not limited to, one or more high temperature-high strength materials such as polycarbonate, polysulfones, epoxies, polyimides, inert metals (e.g., Cu with leachable salts), etc. Constraining layer 50 can range in thickness from, but not limited to 0.1 µm to 1 mm, and generally range from 10 µm to 100 µm. The configuration of the constraining sleeve 50 is non-limiting, as other shape configurations are applicable for imparting directional expansion. Generally, the constraining sleeve is designed to not rupture during the expansion of expandable core 30; however, this is not required. In one non-limiting arrangement, the constraining sleeve is designed to not rupture and may or may not deform during the expansion of expandable core 30. The constraining sleeve can include one or more side openings; however, this is not required. The one or more side opening can be used as an alternative or in addition to the one or more end openings in the constraining sleeve. The one or more side openings (when used) can optionally include a protective coating that partially or fully covers the side opening.

In still another non-limiting aspect of the invention, the high force reactive expandables can be used in medical applications such as expandable devices (e.g., stents, spinal implants, orthopedic applications, implants, etc.). In one non-limiting applications, the high force reactive expandables can be in the form of an arterial stent that is fabricated from shape memory alloys. A hollow sphere of a shape change alloy such as NiTi can be fabricated and then compressed. Upon exposure to a formation temperature after the stent has been implanted, the shape memory alloy returns to its original size. Using a syntactic (microporous) version of the high force reactive expandables, very high strengths can be achieved. Strengths of 60,000 psi have been achieved in syntactic titanium composites, as well as the fabrication of a NiTi alloy syntactic (high toughness alloy for armor).

Figure 3A:
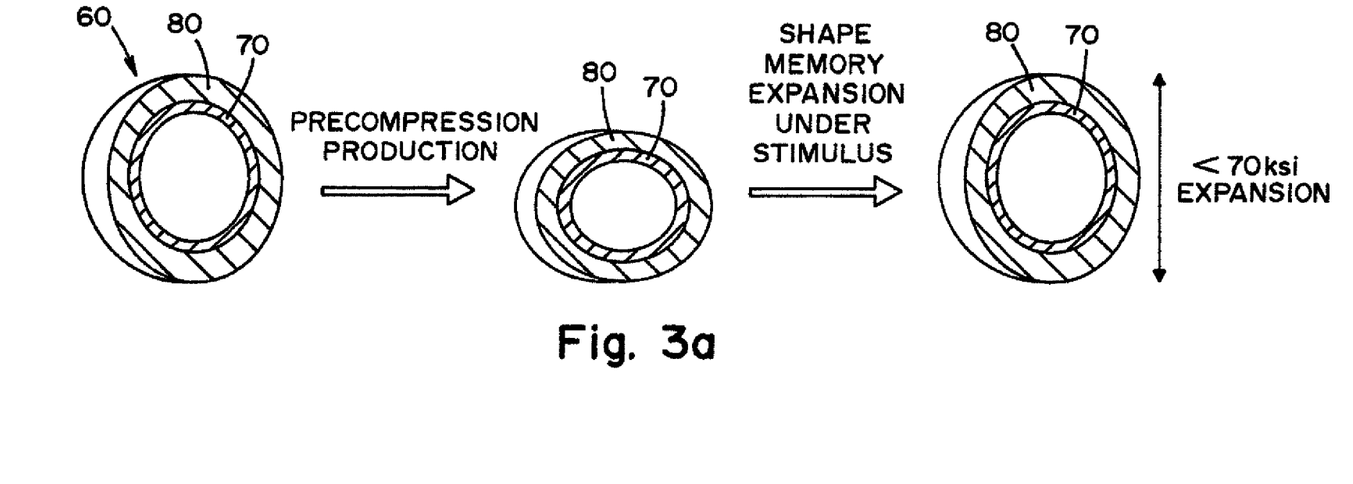
Figure 3B:
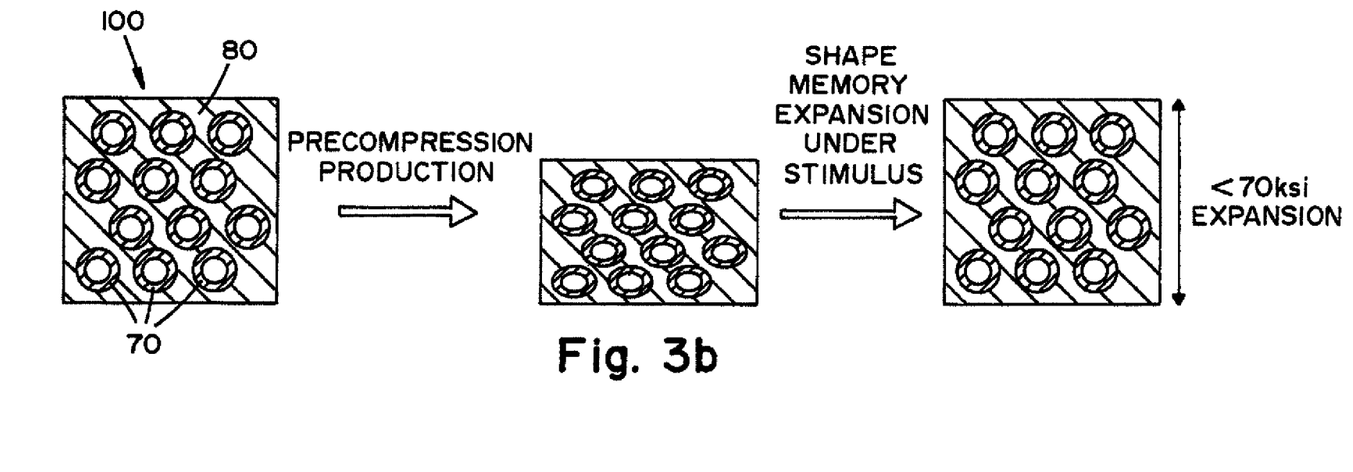

FIGS. 3a and 3b illustrate the construction of shape memory expandables derived from metal or plastic coated hollow sphere 60 or syntactic 100. Shape memory expandables can include, but are not limited to, a hollow sphere core 70 and a plastic or metal coating or composite 80. The shape memory composites 60 and 100 are compressed under temperature promoting plastic yield and then cooled while compressed locking in potential mechanical force to produce shape memory expandables. Under the external stimulus of temperature above glass transition temperatures the shape memory composites return to their uncompressed states exerting up to 30-70 ksi forces and any value or range therebetween. Shape memory expandable materials 60 and 100 can range in size from, but is not limited to, any size from 106 μm to 10 mm and any value or range therebetween, and generally range from 420 μm to 2.36 mm. Hollow sphere core 70 can be comprised of, but is not limited to, glass (borosilicate, aluminosilicate, etc.), metal (magnesium, zinc, etc.), or plastic (phenolic, nylon, etc.), which range in sizes from 10 nm to 5 mm and any value or range therebetween, and generally range from 10 μm to 100 μm. Coating or composite matrix 80 can be comprised of one or more of, but not limited to, metal (titanium, aluminum, magnesium, etc.), or plastic (epoxy, polysulfone, polyimides, polycarbonate, polyether, polyester, polyamine, polyvinyl, etc.), which range in composite volume percentages from 1%-70% and any value or range therebetween. Actual compressed and non-compressed syntactics are illustrated; and in this case, the compression is reversed using the shape memory effects delivering forces as high as 30-70 ksi. Advantages of the shape memory alloy include low density, very high actuation force, and/or very controllable actuation.

Expandable Chemistries

In still another non-limiting aspect of the invention, a feature in the expandable design of the high force reactive expandables is the active expandable material. Active expandable material having reactive mechanical or chemical changes occurring in the temperature range of at least 25° C. (e.g., 30-350° C., 30-250° C., etc. and all values and ranges therebetween) and having a volumetric expansion of over 10% (e.g., 20%-400%, 30%-250%, etc. and all values and ranges therebetween) can be utilized in the present invention. Table 1 lists some non-limiting specific reactions that are suitable for use in the structural expandable materials and for the expandable proppants:

TABLE 1

| | |
|---|---|
| CaO → CaCO3 | 119% expansion |
| Fe → Fe2O3 | 115% expansion |
| Si → SiO2 | 88% expansion |
| Zn → ZnO | 60% expansion |
| Al → Al2O3 | 29% expansion |

The formation of hydroxides and/or carbonates can potentially result in larger expansion percentages.

In still another non-limiting aspect of the invention, there is provided a method to control the rate and/or completion of the oxidation reaction through 1) control over active particle surface area, 2) binder/polymer permeability control, 3) the addition of catalysis (e.g., $AlCl_3$— used to activate iron surfaces), and/or 4) control over water permeability/transport to the metal surface. Ultrafine and near nanomaterials, as well as metallic flakes (which expand primarily in one direction) can be used to tailor the performance and response of these expandable materials. Mechanical properties such as modulus, creep strength, and/or fracture strength can also or alternatively be controlled through the addition of fillers and diluents (e.g., oxides, etc.) and semi-permeable engineering polymers having controlled moisture solubility.

The capability to have a pumpable material that can be triggered or reacted to provide the controlled application of high forces while remaining highly permeable is an enabling technology for the extraction of the lithosphere's (earth crust) mineral, geothermal, and energy resources. The ability to expand existing crack networks without the use of large volumes of water or fluids can greatly reduce the environmental impact of oil and gas stimulation operations. This controlled application of force through in situ temperature changes and/or reaction with formation fluids after placement will improve current well completion technologies by reducing water consumption and costs during hydraulic fracturing, as well as improving resource recovery by better controlling fractures and increasing permeability of existing crack networks. Expandable proppants could potentially replace large volume hydraulic fracturing where pre-existing crack networks are accessible, and also reduce water usage by up to 35% or more as compared to conventional plug and perf technologies. The expandable proppants of the present invention may also be suitable for use in natural gas/water mixtures, particularly since the syntactic SMA (as well as the calcium and aluminum materials) are very low density as compared to conventional frac sands and bauxite proppants, and finer sizes can be used to achieve equivalent permeability with smaller initial fracture widths. Combined with emerging sliding sleeve (or dissolvable plug) completion techniques, fewer and/or better controlled fractures can be extended using a combination of a low water opening and the transport of collapsed, expandable proppants. Thereafter, the crack network can be expanded and extended through in situ reaction during a shut-in period while additional zones are completed. Furthermore, the ability to effectively recover resources in zones with high pump-off losses (such as when penetration into a high permeability zone), and at great distances and at depths where formation pressure and frictional losses are greater than achievable pumping head offers significant benefits in expanding economically recoverable reserves in known formations. By extracting resources more efficiently and with greater control of crack network development enabled through expandable proppants, gas and/or oil output increases can be achieved without coincidental increases in demand for fresh water or extensive cleanup of used water capability to have a pumpable material that can be triggered or reacted to provide the controlled application of high forces while remaining highly permeable is an enabling technology for the extraction of the lithosphere's (earth crust) mineral, geothermal, and energy resources. The ability to expand existing crack networks without the use of large volumes of water or fluids can greatly reduce the environmental impact of oil and gas stimulation operations. This controlled application of force through in situ temperature changes and/or reaction with formation fluids after placement will improve current well completion technologies by reducing water consumption and costs during hydraulic fracturing, as well as improving resource recovery by better controlling fractures and increasing permeability of existing crack networks. Expandable proppants could potentially replace large volume hydraulic fracturing where pre-existing crack networks are accessible, and also reduce water usage by up to 35% or more as compared to conventional plug and perf technologies. The expandable proppants of the present invention may also be suitable for use in natural gas/water mixtures, particularly since the syntactic SMA (as well as the calcium and aluminum materials) are very low density as compared to conventional frac sands and bauxite proppants, and finer sizes can be used to achieve equivalent permeability with smaller initial fracture widths. Combined with emerging sliding sleeve (or dissolvable plug) completion techniques, fewer and/or better controlled fractures can be extended using a combination of a low water opening and the transport of collapsed, expandable proppants. Thereafter, the crack network can be expanded and extended through in situ reaction during a shut-in period while additional zones are completed. Furthermore, the ability to effectively recover resources in zones with high pump-off losses (such as when penetration into a high permeability zone), and at great distances and at depths where formation pressure and frictional losses are greater than achievable pumping head offers significant benefits in expanding economically recoverable reserves in known formations. By extracting resources more efficiently and with greater control of crack network development enabled through expandable proppants, gas and/or oil output increases can be achieved without coincidental increases in demand for fresh water or extensive cleanup of used water.

The ability to systematically apply forces to open crack networks and then exploit the natural crack networks created from drilling operations and from pre-existing crack networks can also enable the development of directional drilling to leach highly valuable minerals without the need for dangerous, costly, and high environmental impact hardrock mining activities.

EXAMPLES

Expandable composite samples were tested using a fracture conductivity test cell per standard instruction found in ISO-13503-5.

1) A high temperature resistant and tough thermoplastic polysulfone with 25% volumetric loading of expanding Fe micro powder showed an unconstrained volumetric expansion of 50% is possible in a solution of 2% KCl at 190° C. over a period of 50 hours.

2) A 30% volumetric loading of expandable metal CaO powder in epoxy binder milled and sieved to 5/16 mesh size showed a 24% volumetric expansion while under 3,000 psig fracture load stress when exposed to a solution of 2% KCl, 0.5M $NaCO_3$ at 60-80° C. in a period of 1 hour.

3) A 30% volumetric loading of expandable metal CaO powder in 6,6 nylon binder under 2,500 psig fracture load stress when exposed to a solution of 2% KCl, 0.5M $NaCO_3$ at 60-80° C. in a period of 1 hour.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall there between. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

What is claimed:

1. A force delivery device adapted for use in a subterranean formation, said force delivery device includes an expandable composite material that is configured to expand, said expandable composite material having a compressive strength after expansion of at least 2,000 psig, said expandable composite material is unreactive in ambient conditions, at least a portion of the expandable composite material when exposed to activating conditions undergoes a volumetric expansion of at least 2% in a period of 1 hour in a fluid environment that contains at least 2% KCl at 60-80° C., said expandable composite material configured to release less than about 10% fines after exposure to crushing strengths of 5-7,000 psig, said expandable composite material formed of an expandable material and a polymer material, said polymer material forming a matrix or binder with said expandable material, said polymer material forming a coating about said expandable material, or combinations thereof, said polymer material selected from the group consisting of polyurea, epoxy, silane, carbosilane, silicone, polyarylate, polyimide, polyester, polyether, polyamine, polyamide, polyacetal, polyvinyl, polyureathane, epoxy, polysiloxane, polycarbosilane, polysilane, nylon, and polysulfone, said expandable composite material includes one or more materials selected from the group consisting of calcium, lithium, CaO, $Li_2O$, $Na_2O$, iron, aluminum, silicon, magnesium, $K_2O$ and zinc, said force delivery device a fluid-actuated telescoping or expandable device which contains said expandable composite material positioned in a structural chamber, said structural chamber having at least one opening to provide fluid connection with said expandable composite material positioned in said structural chamber.

2. The force delivery device as defined in claim 1, wherein said expandable composite material retains a permeability at least 300 millidarcys after expanding with clamping forces of 1000-7000 psig.

3. The force delivery device as defined in claim 1, wherein said matrix or binder material is semi-permeable to water.

4. The force delivery device as defined in claim 3, wherein said mechanical or chemical change to said expandable material at least partially results from said reaction to said expandable material selected from the group consisting of a hydrolization reaction, a carbonation reaction, and an oxidation reaction.

5. The force delivery device as defined in claim 3, wherein said expandable material has a surface coating formulated to control timing, conditions, or combinations thereof under which said reaction occurs, said surface coating includes one or more materials selected from the group consisting of epoxy, polysiloxane, polycarbosilane, polysilane, polysulfone, and nylon.

6. The force delivery device as defined in claim 5, wherein said surface coating has a thickness of 0.1 μm to 1 mm.

7. The force delivery device as defined in claim 1, wherein said expandable composite material includes one or more materials selected from the group consisting of flakes, fibers, powders and nanopowders.

8. The force delivery device as defined in claim 1, wherein said polymer material includes polysulfone.

9. The force delivery device as defined in claim 1, wherein said polymer material includes epoxy.

10. The force delivery device as defined in claim 1, wherein said polymer material includes nylon.

11. The force delivery device as defined in claim 1, wherein said expandable composite material has a size of 1-10 mm.

12. The force delivery device as defined in claim 1, wherein said expandable composite material includes CaO.

13. The force delivery device as defined in claim 1, wherein said expandable composite material includes a catalyst formulated to accelerate said reaction.

14. The force delivery device as defined in claim 13, wherein said catalyst includes one or more materials selected from the group consisting of $AlCl_3$ and a galvanically-active material.

15. The force delivery device as defined in claim 1, wherein said expandable composite material includes strengthening fillers, diluting fillers, or combinations thereof, said strengthening fillers, diluting fillers, or combinations thereof include one or more materials selected from the group consisting of fumed silica, silica, glass fibers, carbon fibers, carbon nanotubes, and other finely divided inorganic material.

16. The force delivery device as defined in claim 1, wherein said expandable composite material is used to provide sealing against high differential pressures by applying sealing forces of at least 2000 psig clamping force or sealing force.

17. The force delivery device as defined in claim 1, wherein said expandable material includes iron micro-powder.

18. The force delivery device as defined in claim 1, wherein said expandable composite material includes 10-80 vol. % of said expandable material mixed in said polymer material.

19. The force delivery device as defined in claim 1, wherein said expandable material constitutes 5-60 vol. % of said expandable composite material mixed in said polymer material.

* * * * *